Figure 1:
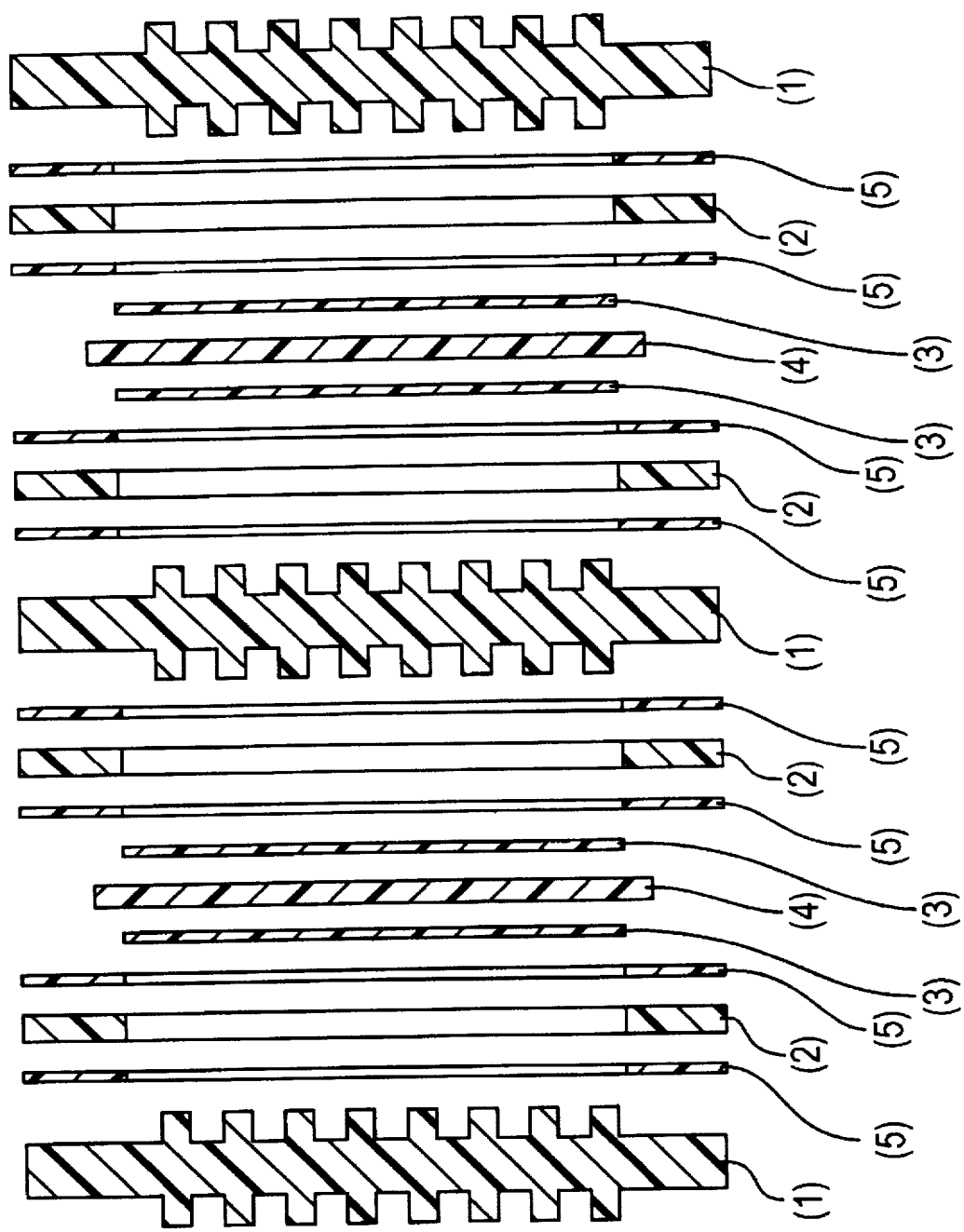

United States Patent [19]

Ledjeff et al.

[11] Patent Number: 5,733,678
[45] Date of Patent: Mar. 31, 1998

[54] POLYMER FUEL CELL

[75] Inventors: Konstantin Ledjeff, Bad Krozingen; Roland Nolte, Denzlingen, both of Germany

[73] Assignee: Fraunhofer-Gesellschaft Zur Forderung Der Angewandten Forschung E.V., Munich, Germany

[21] Appl. No.: 545,696

[22] PCT Filed: Apr. 22, 1994

[86] PCT No.: PCT/DE94/00458

§ 371 Date: Nov. 24, 1995

§ 102(e) Date: Nov. 24, 1995

[87] PCT Pub. No.: WO94/25995

PCT Pub. Date: Nov. 10, 1994

[30] Foreign Application Priority Data

May 4, 1993 [DE] Germany .................. 43 14 745.3

[51] Int. Cl.[6] .................................. H01M 28/10
[52] U.S. Cl. .................. 429/30; 429/33; 429/35
[58] Field of Search .................. 429/12, 30, 33, 429/16, 35, 40

[56] References Cited

U.S. PATENT DOCUMENTS 5,176,966  1/1993  Epp et al. .

FOREIGN PATENT DOCUMENTS

| | | |
|---|---|---|
| 389020 | 10/1989 | Australia . |
| 0328115 | 8/1989 | European Pat. Off. . |
| 0499593 | 8/1992 | European Pat. Off. . |
| 3623854 | 1/1987 | Germany . |
| 3640206 | 6/1988 | Germany . |
| 3640209 | 6/1988 | Germany . |
| 3907819 | 9/1990 | Germany . |
| 4206490 | 9/1993 | Germany . |
| 8702138 | 4/1989 | Netherlands . |
| 2178223 | 2/1987 | United Kingdom . |

OTHER PUBLICATIONS

Extended Abstracts, vol. 87, No. 2, pp. 250-251, Oct. 18, 1987, of Hertwig, "New Approach to a Low Temperature Solid State Fuel Cell".

Primary Examiner—Anthony Skapars
Attorney, Agent, or Firm—Greenblum & Bernstein, P.L.C.

[57] ABSTRACT

The invention relates to a fuel cell with a current collector, polymeric solid electrolyte in the form of membranes, gas distributor rings and currents distributor as components, all components being made from a thermoplastic basic polymer soluble in a solvent, and in that this basic polymer is so modified for the individual components that the current collectors (1) are electrically conductive, the membranes (4) are ion-conductive, the current distributors (3) are gas-permeable and electrically conductive, and the gas distributor rings (2) are made of unmodified and/or electrically conductive basic polymer, and in that the components are combined by a bonding process without seals.

20 Claims, 4 Drawing Sheets

POLYMER FUEL CELL

The invention relates to fuel cells the individual components of which are current collectors, solid electrolytes in the form of membranes, gas distributor ring and current distributors made from one and the same basic polymer, individual components being combined by a bonding process.

Fuel cells are constructed either as separate individual cells or as a so-called fuel cell stack. In the stack construction, a certain number of individual cells are incorporated one after the other, in order to provide a correspondingly higher output voltage. The fuel cell most frequently used, a hydrogen/oxygen fuel cell, is predominantly constructed from the following individual components: a current collector, a hydrogen gas distributor ring, an ion-exchange membrane, current distributor structures and hydrogen gas distributor rings. In the case of individual cells, there are used as current collectors positive or negative plates, and in the case of fuel cell stacks, there are used as current collectors bipolar plates, which are built up into a corresponding fuel cell stack. In prior art, until now the individual components have been connected together via seal rings.

This procedure however has considerable disadvantages. The use of seal materials is in general not an uncritical factor as, in addition to the required sealing properties, the material must withstand pure and moist oxygen and hydrogen at an increased temperature (approximately 80° C.) as a permanent load, without the occurrence of embrittlement or degradation. The use of materials with additives or plasticisers as proposed for this purpose then has the result that these materials diffuse out in the process of time, are deposited elsewhere or contaminate the catalyst, which can lead to breakdown of the system. Materials without additives frequently require a high contact pressure in order to ensure the sealing effect. This in turn requires membranes which are mechanically extremely stable, in order to withstand these stresses. Thin membranes, whose use is desirable because of their extremely good ion conductivity, cannot be produced by the previous techniques known to prior art.

In particular, in the case of fuel cell stacks, the use of seal materials gives rise to further problems. Due to the mechanical deformability of the seal material an alteration occurs in the geometric position relative to one another of the individual components. In particular, in the case of ion exchanger membranes clamped between two seal rings, the formation of creases in the membrane material is possible, which represent potential breakage points during operation. Such material failure can then lead to a direct contact between hydrogen and oxygen, which will involve failure of a cell.

Proceeding from this prior art, the purpose of the present invention is to propose a fuel cell or a fuel cell stack in which the use of seal material between the individual components is minimised or entirely avoided.

This purpose is fulfilled by the characterising features of claim 1. The secondary claims 2 to 14 show advantageous further developments.

Due to the solution according to the invention, i.e. the production of all components from one and the same basic polymer, or from a modified form thereof for the individual components, a situation is achieved in which the individual components may be connected together by a bonding process and thus sealing material may be minimised or entirely avoided.

In this respect the thermoplastic polymer provided for the production of the individual components is of critical importance.

Only those thermoplastic polymers are suitable in this case which satisfy the specific mechanical and chemical requirements arising in a hydrogen/oxygen fuel cell.

The thermoplastic polymer provided must be suitable as a constructional material for supporting parts of the fuel cell structure, i.e. must have dimensional stability under pressure and at increased temperatures. In addition, the material must not be attacked chemically by dry and moist hydrogen or oxygen, and in addition must be hydrolytically stable.

A further requirement is that the thermoplastic material must retain all the above properties stably up to a minimum temperature of 80°.

These properties by themselves are necessary, but are not sufficient for the concept according to the invention of the polymer fuel cell. It must in addition be possible to modify the material in such a way that such specific physical or chemical properties may be realised as are necessary for the respective individual components. For the current collectors, i.e. for the positive and negative plates or the bipolar plates, as also for the current distributor structure, it must be possible to render the polymeric basic material electrically conductive. For the ion exchange membrane it must be possible to make the same material conductive to ions.

According to the invention, there are suggested as polymeric basic materials those thermoplastic polymers which have an "aromatic spine" and are soluble in suitable solvents. The degree of polymerisation of the basic polymer must be selected in this respect. Such polymers are:

Polysulphones (I)

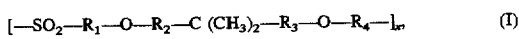

with $R_1, R_2, R_3, R_4 = -C_6H_4-, -C_{10}H_6-;$

Polyether sulphones (II)

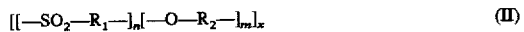

with $R_1, R_2 = -C_6H_4-, -C_{10}H_6-;$
$n,m = 1$ or $2$

Polyether ketones (III)

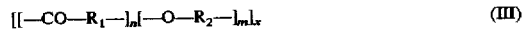

with $R_1, R_2 = -C_6H_4-, -C_{10}H_6-;$
$n,m = 1$ or $2$

Polyphenylene sulphides (IV)

with $R_1 = -C_6H_4-,$ x being capable of varying within wide limits, yet it is required that the polymer be soluble in a suitable solvent. X therefore preferably lies between 5 and 10,000, depending on the polymer and the solvent.

It is however also possible according to the invention that copolymers of the monomers described above may be used. Particularly preferred is the use of polyether sulphone (PES). PES is characterised by high tensile strength, impact resistance, resistance to heat deformation and to chemicals, and at the same time is flame resistant and self-extinguishing. Therefore PES is particularly suitable as a thermoplastic polymer for the use according to the invention.

In addition, PES has no aliphatic CH-bonds, but only aromatic CH-bonds. Because of the higher bonding energy of aromatic CH-bonds compared to the aliphatic, such substances are considerably more stable compared to a radically-occurring oxidation by oxygen, and thus possess the properties of stability for use in an oxygen-containing environment in the fuel cell. In addition, PES possesses no easily-hydrolysed functional groups, such for example as ester groupings, but only sulphone or ether groups which are only attacked with difficulty, and thus behaves in an extremely stable manner in the face of hydrolytic reactions. A further advantage with PES is that, due to the fact that PES may be processed by injection moulding or by extrusion, it is also possible to connect together individual components made of PES by plastics welding or gluing. In addition, by means of the incorporation of conductive particles as a modification technique, electronically conductive plastics may be produced. The aromatic rings in the polymer spine offer the possibility of introducing ionic groupings chemically, in order in this way to produce ion-conductive plastics. Thus PES possesses all the relevant properties which are necessary in use as a basic material for the polymer fuel cells.

The individual components may then be manufactured with this basic polymer or with its modified forms.

In order to produce the current collectors, i.e. the positive and negative plates or the bipolar plates, the polymeric thermoplastic basic material must be modified in order to achieve electrical conductivity. This is achieved by the addition of conductive substances such for example as high-conductivity carbon black, graphite, carbon fibres, electronically-conductive polymer-p articles or fibres (e.g. polyaniline), metal particles, flakes, fibres or metallised carrier material. The incorporation of conductive particles in this case may be achieved in various ways:

1. The conductive particles are added to the molten polymer, the homogeneous fine distribution being achieved after dispersal by kneading or mixing mechanisms.

2. The conductive particles are stirred with the aid of stirrers or mixers into the thermoplastic system dissolved in a solvent, and are subsequently dispersed until the desired fine distribution is achieved.

3. The conductive particles are intensively mixed with the pulverulent polymer without melting the polymer ingredient, and are then hot-pressed. In this case there is no homogeneous distribution of the conductive particles in the material to be modified, but the conductive particles surround the polymer particles which are present in discrete form.

Apart from the properties and composition of the initial products (conductive particles), polymer, the conductivity of the mixtures depends also on the processing parameters. In the case of a carbon black-polymer mixture, carbon black concentrations between 5 and 70%, preferably between 15 and 50% are necessary for providing conductivity. The mechanical properties of the modified products alter insofar as rigidity and resistance to heat deformation have increased, and elongation and impact resistance are lowered. These alterations are not critical for the use in the polymer fuel cell, as good rigidity and resistance to heat deformation are predominantly required.

The gas distributor rings may be produced either from unmodified polymeric basic material or from electrically conductive polymer material as described above.

The ion exchange membrane is responsible for proton transport between the hydrogen and oxygen sides of an individual cell, i.e. it must consist of material capable of conducting cations. This capacity for cation conduction in an aqueous environment is achieved in a polymer material in that acid groupings such for example as carboxylic acids (—$CO_2H$), sulphonic acids (—$SO_3H$) or phosponic acids (—$PO_3H_2$) are introduced chemically, which dissociate into ions in an aqueous environment.

Typically, the intensively acidic sulphonic acid groups are used for these highly ion-conductive membranes. The basic materials suitable for the polymer fuel cell contain aromatic ring systems, upon which, as is known from the literature, substitutive reactions may be carried out with the introduction of ionic groups. Suitable reagents for introducing sulphonic acid groups are for example sulphur trioxide or chlorosulphonic acid. The degree of sulphonation required to achieve higher conductivities moves in a range from 3 to 200%, more typically in a range between 50 and 100%.

The membrane can consist over its entire surface of ion-conductive material (1-component membrane). This structure will in particular be selected when no solid connection is required with other components of the fuel cell. Furthermore, the membrane may be built up from two materials (2-component membrane). In this case the membrane consists of an inner, ion-conductive surface surrounded by an outer non-ion conductive surface consisting of the basic material. This has the advantage that in the case of a surface-to-surface bond of the membrane to the gas distributor ring by means of gluing or welding, two totally identical materials are connected together, leading to a more stable connection of the two parts. Furthermore, the construction as a 2-component membrane prevents the undesirable alterations in length and volume of the lateral region caused by the high degree of swelling of ionic polymers in water, as the non-ionic basic material only swells in water to a negligible degree. This membrane structure may be produced in various ways:

1. A film of the unmodified basic material, from which a part is stamped out at the point at which the ion-conductive region is to be located, is fixed on a base. The ion-conductive material is dissolved in a solvent in which the unmodified material is also soluble. The solution is poured into the recess in the film, so that the edges of the film are etched. The membrane film is then dried at temperatures in the range 20°–250° C. and removed from the base.

2. A film of the unmodified basic material, from which a piece is stamped out at the point where the ion-conductive region is to be located, is fixed on a base. A piece of film from the ion-conductive material, which has the exact shape of the recess, is fixed in said recess. An adhesive system connects the two films. Preferably, the adhesive system consists of a polymer dissolved in a solvent in which both the basic material and the ion-conductive material are soluble. There come into consideration for the polymer components of the adhesive system mainly the unmodified basic material itself, the ion-conductive material or mixtures, block or graft copolymers of the two abovenamed materials.

3. A film of the unmodified basic material, from which a piece is stamped at the point where the ion-conductive region is to be located, is fixed on a base. Then a film of ion-conductive material is laid over the recess. Thus the surface of the ion-conductive film is slightly larger than that of the recess, so that both films partially overlap. The overlapping edges may be glued by an adhesive system, as described in the previous point. Finally both films are pressure-welded, until a planar membrane film results. In this respect particular note should be taken that the inner ion-conductive surface is only thermally stressed to such an extent that none of its exchanger functions is destroyed. The exchanger functions may be destroyed in the overlapping region.

4. A film of unmodified basic material, from which a part s stamped out at the point where the ion-conductive region is to be located, is fixed on a base. Then a film of ion-conductive material is laid over the recess. Thus the surface of the ion-conductive film is slightly larger than that of the recess, so that both films partly overlap. The overlapping edges can be glued by an adhesive system, as described in the preceding point. A second film of the unmodified base material with similar dimensions to the first, is laid on the system, adhesion being likewise possible with the overlapping regions of the ion-conductive film. Finally, the films are pressure-welded until a planar membrane surface results. Here also note should be taken that the inner ion-conductive surface is thermally stressed only to such an extent that no exchanger functions are damaged. The exchanger functions may be destroyed in the overlapping region.

In a further variant of the 2-component membrane, the membrane is firstly produced over its entire surface from ion-conductive material. Subsequently the outer region of the membrane is modified, so that, by means of degradative and/or cross-linking reactions, the high degree of water swelling is intensively reduced. Further treatment may for example be a temperature treatment, the membrane being heated between two hot plates to temperatures above 200° C. An important factor in this respect is that only the outer regions of the membrane are exposed to the high temperature, so that the central region of the membrane surface remains ionically conductive and can serve as a solid electrolyte.

Depending on the structure of the polymer fuel cell, various sizes of the membrane may be required. In one variant, the membrane is smaller than the gas distributor ring. It is of such a size that it still partly overlaps it, but does not reach as far as the bore for the gas/water ducts. In a second variant the membrane is of the same size as the gas distributor ring and itself contains bores for gas/water ducts.

The polymeric basic material must also be modified in order to produce the current distributor structures. In the fuel cell stack the current distributor structure lies between the bipolar plate and the membrane coated with catalyst. It ensures supply or collection of current, or supply or collection of gas, in a uniform manner over the membrane surface. Therefore the material must have the properties of being gas-permeable and electrically conductive. Previously known materials such for example as nets or textiles of metal or carbon fibres, porous metallic sintered members or porous carbon papers may possibly be used as a constructional material. Likewise, conductive polymeric materials may be used as a constructional material; the material must be porous in order to enable gas permeability. This porosity may for example be achieved by finely-ground inorganic salts soluble in water, acids or lyes, added before the processing of the constructional material. Said salts are subsequently dissolved out, and produce the porous structure.

It is now proposed according to the invention to combine individual components together by means of a bonding process, e.g. welding or gluing. In this way it is now possible for fuel cells or fuel cell stacks to be constructed which require either no sealing at all or very little sealing material.

Figure 2:
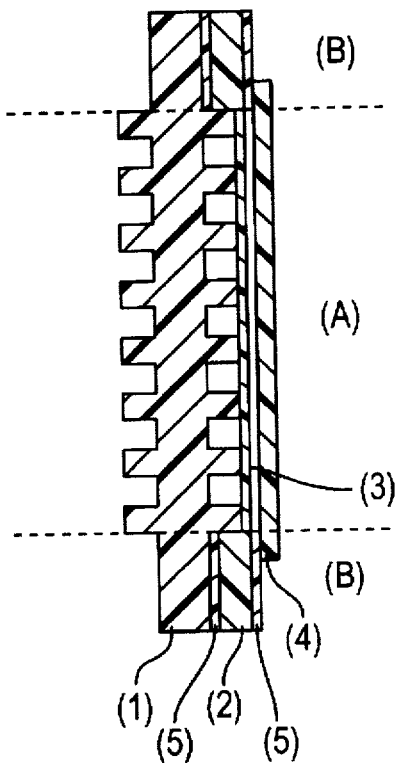
Figure 3:
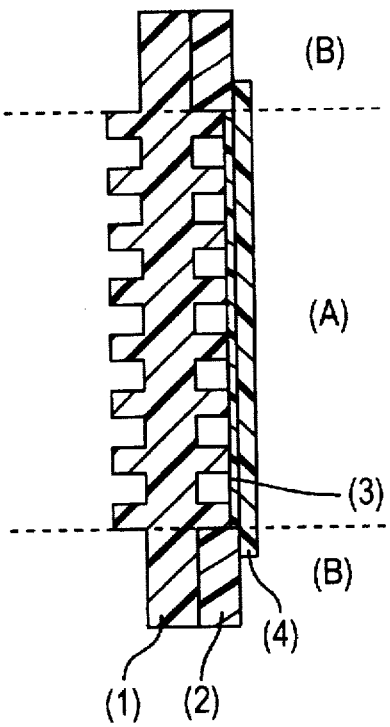
Figure 4:
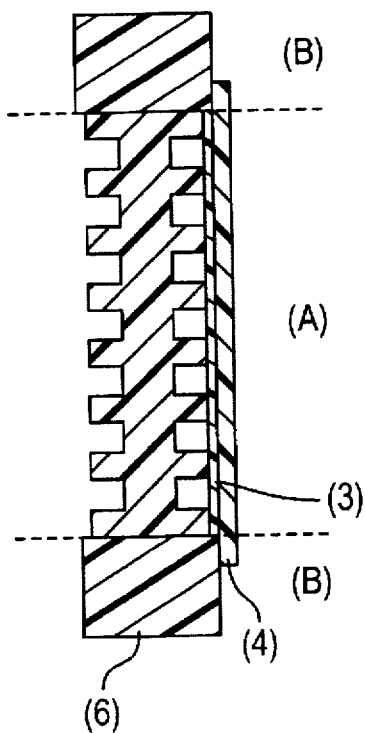
Figure 5:
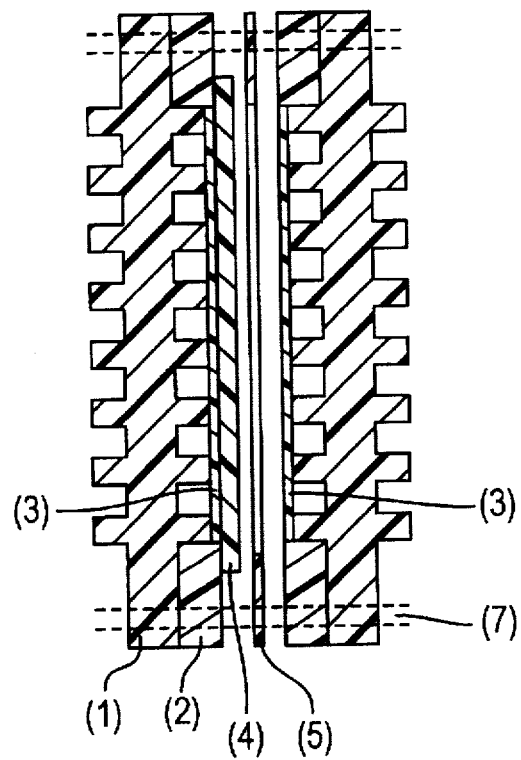
Figure 6:
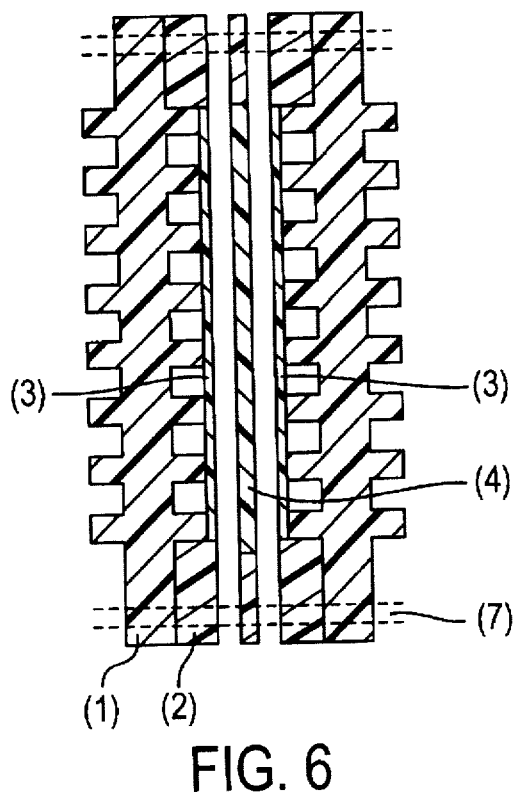
Figure 7:
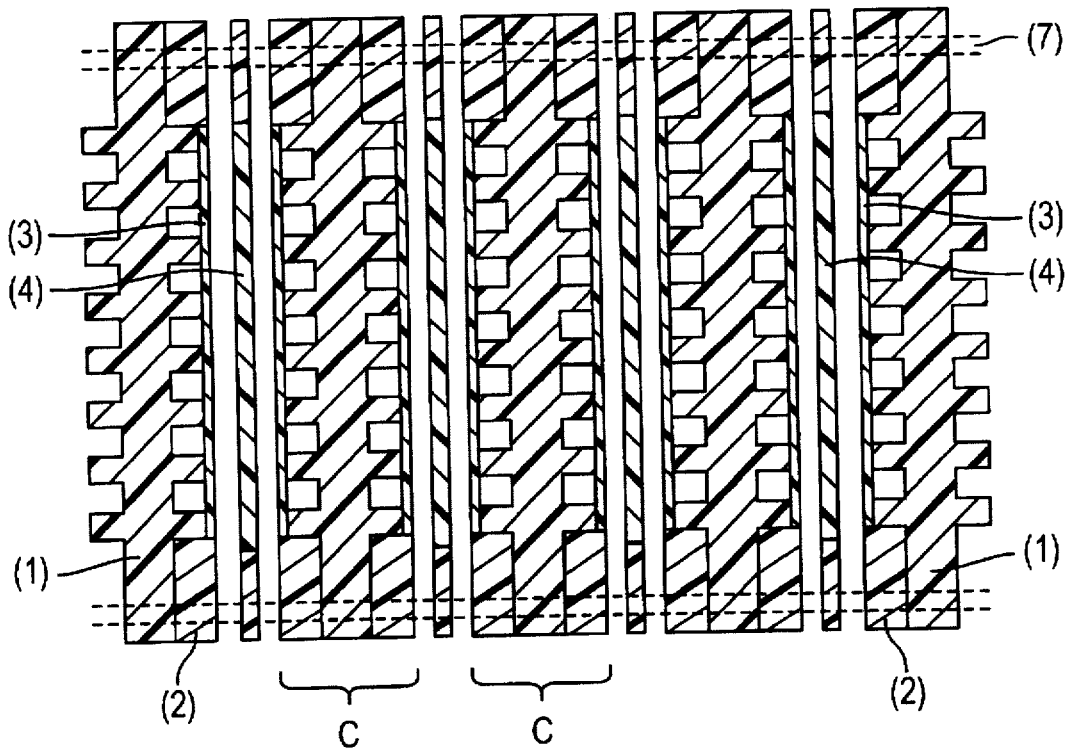

Further features, details and advantages of the invention will become apparent from the following description of the embodiment of the invention given by way of example, and with reference to FIGS. 1–7. The embodiment relates to a fuel cell stack. Shown are:

FIG. 1: the basic structure of a hydrogen/oxygen fuel cell stack according to prior art;

FIG. 2: a previously-known fuel cell stack in the structural region "bipolar plate, ion exchanger membrane";

FIG. 3: the structure according to the invention of the region "bipolar plate, ion exchanger membrane", the distributor unit comprising two individual components;

FIG. 4: the structure according to the invention of the region "bipolar plate, ion exchanger membrane", the distributor unit comprising one component;

FIG. 5: the overall structure of a polymeric fuel cell with a seal ring;

FIG. 6: the overall structure of an individual cell without seal rings;

FIG. 7: the structure of the core region of fuel cell stack by means of components C.

FIG. 1 shows the basic structure of a hydrogen/oxygen fuel cell stack as known from prior art. The individual components important for the construction of the stack of a hydrogen/oxygen fuel cell conventionally consist for a cell unit of a bipolar plate 1, the gas distributor ring 2, the ion exchange membrane 4, and the current distributor structures 3. For reasons of clarity, illustration of the catalyst coating of the membrane is omitted in this and in the following figures, as it is non-essential for the following description.

The basic structure shown in FIG. 1 shows the core region of the fuel cell stack. This core region is then defined by corresponding positive or negative end plates. In order to ensure a seal of the individual components from one another, seals 5 are provided. In this case the seals 5 are respectively disposed between the bipolar plate 1 and the gas distributor ring 2, and between the gas distributor ring 2 and the membrane 4. The fuel cell is then combined by pressure.

As already stated in the description of the prior art, the use of sealing materials involves serious disadvantages. Due to the mechanical deformability of the seal material there on the one hand occur alterations in the geometric position of individual components relative to one another, and on the other hand, due to permanent loading on the sealing material at increased temperatures, embrittlement or degradation occurs.

FIG. 2 now shows the basic structure of the region "bipolar plate ion exchanger membrane" in a previously known fuel cell stack. Between the bipolar plate 1 and the ion exchange membrane 4 are two seal rings 5, the gas distributor ring 2 and the current distributor structures 3. An important factor in this respect is that the ion exchange membrane 4 abuts in regions A and B on surfaces which cannot be certainly said to lie in one plane. In region A the membrane 4 lies on a fixed base, whereas in region B the thickness of the block (seal-distributor ring seal) is alterable depending on the contact pressure and component tolerances. Therefore in the transition from regions A to B, a height differential occurs in the contact surface of the membranes, which leads to sharp creases and potential breakage points in the membrane.

FIG. 3 now shows the solution according to the invention for the region "bipolar plate ion exchange membrane". The polymer fuel cell according to the invention circumvents the problem shown with reference to FIG. 2, the bipolar plate 1 and the gas distributor ring 2 being made of the same polymeric basic material and thus being capable of being welded or glued together. With this construction it can be ensured that the membrane base in regions A and B always lies in one plane, so that no dangerous material creases can arise. Thus the use of seals in this region can be eliminated. The membrane 4 may be glued or welded to the gas distributor ring 2.

Such a bonding process is however not absolutely necessary; the solution according to the invention may also be realised by combining both components by the use of pressure.

An alternative solution for the structure of the region "bipolar plate exchange membrane" is shown in FIG. 4. Instead of the glued or welded combination comprising bipolar plate 1 and gas distributor ring 2, a distributor unit 6 produced as one piece may be used.

The overall structure of an individual cell for a stack with a seal ring 5 may be seen from FIG. 5. According to FIG. 5, for each cell half, the respective bipolar plate 1 is welded or glued to the respective gas distributor ring 2 and forms the so-called distributor unit. The current distributor structure 3 in this case may likewise be welded or glued to the bipolar plate 1, insofar as the material selected for the current distributor structure 3 permits corresponding processing. This structure is termed a half cell according to the invention.

There is now fixed upon a half cell the membrane 4, which can be welded or glued to the gas distributor ring 2, but not necessarily. In this case the diameter of the membrane 4 is such that, seen from the centre, it extends slightly over the beginning of the gas distributor ring 2, but still terminates clearly before the bores 7 for the gas/water ducts. Connection of the two half cells is effected by a seal ring 5. The seal ring 5 contains bores 7 for the gas/water ducts and covers both the end of the membrane 4 and also the gas distributor ring 2, so that sealing of the half cells from one another, and sealing of the half cells from the gas/water ducts is provided. The membrane 4 is based on the thermoplastic basic material and may consist either only of ion-conductive materials or of a combination of non-ion-conductive and ion-conductive basic material, as described above. Alternatively, instead of the glued or welded combination of bipolar plate 1 and gas distributor ring 2, a distributor unit 6 produced as one part may be used.

The construction of a single fuel cell is similar. Instead of the design of the current collector 1 as a bipolar plate, an end plate is used. The fuel cell is then constructed from two such half cells, i.e. from a half cell with a positive end plate and a half cell with a negative end plate (not illustrated). The bond with the membrane 4 is effected as described above for the individual cell of the stack.

FIG. 6 shows the overall structure of an individual cell according to the invention without seal rings. According to FIG. 6, for each half cell the respective bipolar plate 1 is welded or glued to the respective gas distributor ring 2, and forms the so-called distributor unit. The current collector structure 3 may likewise be welded or glued to the bipolar plate, insofar as the material of the current distributor structure selected permits corresponding processing. In this case the membrane 4 has the same diameter as the gas distributor rings 2 and includes the bores 7 for the gas/water ducts. The membrane 4 is welded or glued on both sides to the gas distributor ring 2 of the respective half cell. The membrane 4 is based according to the invention on the thermoplastic basic material and may consist either of ion-conductive material or of a combination of non-ion-conductive and ion-conductive basic material, as described above. In this embodiment, also, instead of the combination of bipolar plate 1 and gas distributor ring 2, a distributor unit 6 produced as one piece may alternately be used.

As already explained in the description of FIG. 5, an individual cell may be constructed similarly, using the positive and negative end plates without a seal. Instead of the respective bipolar plate 1, then a positive or negative end plate is used.

A fuel cell stack (FIG. 7) is now built up from a plurality of these individual cells. The core region of the fuel cell stack in this case is so constructed that there is disposed on either side of a bipolar electrode 1, respectively in the direction of the interior of the individual cells, a current distributor 3 and a gas distributor ring 2, as described above. This constructive unit is identified according to the invention as component C. The core region is now formed from n of these components C, these n components C being in turn connected by membranes 4. For reasons of better visibility, a free space is left between the membrane 4 and the component C. In the finished fuel cell stack, naturally, the membrane 4 is, as already described, connected with the constructive unit C. The core region of the fuel cell stack can, as already described with reference to the individual cells, again alternatively be constructed from a distributor unit 6 comprising one unit. Naturally, a structure of a cell according to the invention is possible in which an individual seal ring is provided respectively between the membrane 4 and the constructive unit C, similarly to FIG. 5.

In order to construct a complete fuel cell, 2–300 components C are preferably used. The complete cell is then formed from a positive, and on the opposite side from a negative end plate, which are in turn connected by welded or glued membrane to the core unit.

A final permanent method of holding together the individual components of the fuel cell or of the fuel cell stack is necessary in order to ensure good contact of the membrane side coated with catalyst with the current distributor structures, and in order to guarantee the seal quality of the cell. A permanent method of holding the components together may be achieved in that the construction is combined under pressure by final screwing or similar mechanical measures, exerting pressure. It is likewise possible to ensure that the components are held together by final welding/gluing of the individual distributor units together. In this case auxiliary materials may be used, such for example as films/plates of unmodified polymeric basic material, which, in order to produce the permanent connection, are laid around the distributor unit to be connected, and are welded or glued thereto.

According to the invention, the individual components or, as described above, the finished fuel cell, may be held together by a bonding process. The idea of constructing all the components of the fuel cell from the same basic material, now enables stable connection, e.g. by gluing or welding, as no incompatibilities or segregations are to be expected, as generally occur with the individual components of fuel cells known in prior art.

According to the invention, welding or gluing is preferably used as a bonding process.

According to the invention, by plastics welding is meant the unification of thermoplastic plastics by the use of heat and force, or with welding additive. For this purpose the surfaces of the joint portions must be brought into a plastic state. In principle, the connection of the components may be effected by one of the processes described hereinafter, the various welding processes being listed in the following, by means of which the surfaces of the joint portions may be brought into a plastic condition. The following welding processes are particularly considered:

1. Heating element welding: the joint surfaces are heated by predominantly electrically heated metallic components. The heat can flow directly from the heating element to the joint surfaces (direct heating element welding), or it can flow through a joint portion to the joint surfaces (indirect heating element welding).

2. Ultrasonic welding: plastification of the surface is effected by the introduction of ultrasound. Ultrasonic welding is based on the mechanical damping capacity of the polymer.

In almost all plastics, the mechanical damping is so great that welding is possible by the ultrasonic process.

Other welding processes are in principle possible (hot gas welding, frictional welding or high frequency welding); these however are not suitable for all plastics materials or mould types. It is known of polyether sulphone that the material may be worked by means of heat or ultrasonic welding.

Connection by adhesives is preferred as a further combining process.

The adhesive quality of a glue connection is influenced by adhesion and cohesion, adhesion being taken to mean the bonding forces at the bordering surfaces between the bodies to be glued and the glue, and by cohesion the bonding forces in the glue itself. In principal, all types of adhesive are feasible for connecting the components of the polymer fuel cell, such as solvent glues, dispersion glues, melt glues, contact glues, polymerisation, polyaddition and polycondensation glues.

However, due to the solubility of the components of the polymer fuel cell, solvent glues are in particular used. As solvent components of the adhesive system those come under consideration in which both joint portions are soluble. The solvent diffuses partly into the joint portions, so that the interaction between glue and joint portion is favoured (good adhesion).

When polyether sulphone is used as a polymeric basic material, and sulphonated polyether sulphone as an ion-conductive material, dimethylformamide may for example be used. There serves as a polymer component in the adhesive system either the polymeric basic material itself, the modified, ion-conductive basic material, mixtures of both, or copolymers, particularly block and graft copolymers. When two surfaces of polymeric basic material are glued, this material predominantly will also be a component of the adhesive system, as then in any case, due to the miscibility of the polymeric components of adhesion and joint portions, a permanent connection may be produced (good adhesion). As the polymer components in the adhesive are of the same material as the joint portions themselves, likewise good cohesion is produced. Copolymers are particularly used as adhesive components when not exactly identical materials are to be glued, such for example as ion-conductive and non-ion-conductive material. Graft and block copolymers may then contribute to a secure connection of the generally immiscible materials during gluing, as both materials in the block or graft copolymers are linked by chemical bonding on a molecular plane.

Likewise possible is jointing with pure solvents without added polymer, which is also termed swell welding.

In the case of gluing of two conductive pieces, it may be necessary to extend the composition of the glue explained above by the addition of conductive particles, in order to ensure electrical conductivity of the adhesion.

We claim:

1. A fuel cell, comprising components including current collectors, a polymeric solid electrolyte in the form of a membrane, gas distributor rings, and current distributors, said components being composed of a thermoplastic basic polymer soluble in a solvent, said basic polymer being modified for the individual components such that the current collectors are electrically conductive, the membrane is ion-conductive, the current distributors are gas-permeable and electrically conductive, and the gas distributor rings are made of at least one of unmodified basic polymer and electrically conductive basic polymer, and wherein the basic polymer is made from monomer units selected from the group consisting of polysulphones of the general formula I:

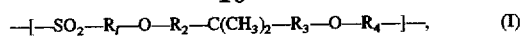

with $R_1, R_2, R_3, R_4 = -C_6H_4-, -C_{10}H_6-$;

polyether sulphones of the general formula II:

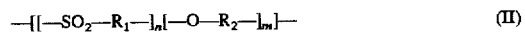

with $R_1, R_2 = -C_6H_4-, -C_{10}H_6-$ n, m=1 or 2;

polyether ketones of the general formula III:

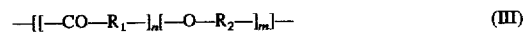

with $R_1, R_2 = -C_6H_4-, -C_{10}H_6-$ n, m=1 or 2;

and polyphenylsulphides of the general formula IV:

with $R_1 = -C_6H_4-$.

2. The fuel cell of claim 1, wherein the thermoplastic basic polymer is a homopolymer.

3. The fuel cell of claim 1, wherein the thermoplastic basic polymer is a copolymer of said monomer units.

4. The fuel cell of claim 1, wherein the fuel cell comprises:

a first half cell including a first current collector, a first gas distributor ring, and a first current distributor; and a second half cell including a second current collector, a second gas distributor ring, and a second current distributor, the second half cell being connected via a membrane with the first half cell.

5. The fuel cell of claim 4, wherein connection of the half cells with the membrane is effected without a seal.

6. The fuel cell of claim 4, wherein connection of the half cells with the membrane is effected via a seal.

7. The fuel cell of claim 1, wherein the fuel cell forms a fuel cell stack wherein there are disposed on either side of a bipolar current collector, respectively in a direction from an interior of individual cells, a current distributor and a gas distributor which together comprise a component C, n components C respectively being combined via membranes, n being between 2 and 300.

8. The fuel cell of claim 7, wherein connection of the n components C with the membranes is effected without a seal.

9. The fuel cell of claim 7, wherein connection of the n components C with the membranes is effected via a seal.

10. The fuel cell of claim 7, wherein the n components C are defined by half cells comprising a current collector, a gas distributor ring, and a current distributor, and wherein the half cells are connected via membranes.

11. The fuel cell of claim 10, wherein connection of the half cells with the membranes is effected without a seal.

12. The fuel cell of claim 10, wherein connection of the half cells with the membranes is effected via a seal.

13. The fuel cell of claim 1, wherein at least one of the current collectors is combined with at least one of the gas distributor rings by one of gluing and welding to form a distributor unit.

14. The fuel cell of claim 13, wherein the distributor unit is made from a modified polymeric basic material which is electrically conductive.

15. The fuel cell of claim of claim 1, wherein at least one of the current collectors is combined with at least one of the gas distributor rings in a one piece construction to form a distributor unit from a modified polymeric basic material which is electrically conductive.

16. The fuel cell of claim 15, wherein the distributor unit is produced by injection molding.

17. The fuel cell of claim 15, wherein the distributor unit is produced by pressing.

18. The fuel cell of claim 13, wherein one of the current distributors is combined with the distributor unit by one of welding and gluing.

19. The fuel cell of claim 1, wherein the individual components of the fuel cell are held together under pressure.

20. The fuel cell of claim 1, wherein the components are combined by a bonding process.

* * * * *